United States Patent [19]

Gurak et al.

[11] Patent Number: 4,889,670

[45] Date of Patent: Dec. 26, 1989

[54] PROCESS FOR MANUFACTURING GREEN AND CERAMIC FOAM

[75] Inventors: Nur R. Gurak; Ronald J. Thompson; James P. Russell; Joseph M. Yarkovsky, all of Sarnia, Canada

[73] Assignee: BASF Aktiengesellschaft, Ludwigshafen, Fed. Rep. of Germany

[21] Appl. No.: 162,505

[22] Filed: Mar. 1, 1988

[51] Int. Cl.$^4$ .............................................. C04B 38/00

[52] U.S. Cl. ........................................ 264/50; 264/43; 264/56; 264/63; 501/80; 501/82

[58] Field of Search .................................. 501/80–83; 264/43, 50, 42, 56, 63

[56] References Cited

U.S. PATENT DOCUMENTS

| | | | |
|---|---|---|---|
| 2,845,659 | 8/1958 | Calvert | 264/50 |
| 2,861,963 | 11/1958 | Butsh | 264/50 |
| 2,933,768 | 4/1960 | Morris | 264/50 |
| 3,281,258 | 10/1966 | Callahan | 264/50 |
| 3,288,727 | 11/1966 | Waterman et al. | 264/50 |
| 3,301,798 | 1/1967 | Waterman et al. | 264/50 |
| 3,732,139 | 5/1973 | Fechilias | 161/170 |
| 4,169,172 | 9/1979 | Bethe | 264/50 |
| 4,374,202 | 2/1983 | Zucker et al. | 501/82 |
| 4,473,667 | 9/1984 | Sands | 264/50 |
| 4,474,919 | 10/1984 | Polatajko-Lobos et al. | 524/377 |
| 4,508,864 | 4/1985 | Lee | 524/187 |

FOREIGN PATENT DOCUMENTS

| | | |
|---|---|---|
| 0211575 | 2/1987 | European Pat. Off. . |
| 2606975 | 8/1976 | Fed. Rep. of Germany . |
| 52-019768 | 2/1977 | Japan . |
| 52-077114 | 6/1977 | Japan . |
| 54-085209 | 7/1979 | Japan . |
| 2138830 | 10/1984 | United Kingdom . |

OTHER PUBLICATIONS

Chemical Abstract 85: 193774s.

*Primary Examiner*—Hubert C. Lorin
*Attorney, Agent, or Firm*—Bruce E. Harang

[57] ABSTRACT

Porous green ceramic parts may be prepared by compounding 90 to 60 weight percent of a particulate ceramic material with 10 to 40 weight percent, on a dry basis, of a latex of a polymer. The compound is frothed, shaped and set. The green part may then be sintered. The process avoids the expense of preparing solid ceramic compounds containing waxes or sawdust which burn out to create voids. The process is useful to prepare ceramic filters, catalysts, or light weight metal ceramic foams.

21 Claims, No Drawings

PROCESS FOR MANUFACTURING GREEN AND CERAMIC FOAM

FIELD OF THE INVENTION

The present invention relates to the manufacture of green ceramic foams, and ceramic foams. More particularly the present invention relates to the manufacture of such foams by gel and no gel processes.

BACKGROUND OF THE INVENTION

Ceramic foams have a number of applications including filtering and refractory uses. Unfortunately ceramic foams are difficult to produce. Generally, such foams have been produced by incorporating into the ceramic a material which would be lost on sintering, such as saw-dust or a wax. Such processes produced porous ceramic materials but were time consuming, and expensive.

U.S. Pat. No. 4,374,202 issued Feb. 15, 1983 assigned to R. M. Industrial Products Company discloses a process for making a foamed refractory. An aqueous dispersion of binder, ceramic fiber and filler is frothed and then heated to set the foam. The resulting green ceramic foam may then be sintered. This art does not teach a process which may be used with less than 50 percent of ceramic fiber. Furthermore, the disclosure does not clearly teach the use of "gelling agents" to set the foam.

The Derwent abstract of Japanese Patent JP 52019768, discloses applying a PVC emulsion containing a blowing agent to a surface of a ceramic and foaming the PVC. The foam does not contain any ceramic material. Rather, a flexible foam is applied to a preformed ceramic material. The present invention contemplates the manufacture of a foamed ceramic.

There are several proposals to impregnate a preformed foam material with ceramic material and then to burn out the foam. Generally, the foam is a urethane. Representative of this type of art are the Derwent abstracts of Japanene Patents JP 54085209 and JP 52077114.

Chemical Abstract 85:193774S of DE 2,606,957 to Jensen et al teaches incorporating a ceramic material into a wet foam of a ceramically, hydraulically, or chemically setting material such as a urea resin. The present invention does not contemplate the use of the urea type resins as disclosed in CA 85:193774S.

EP 0 211 575 published 25-02-87 in the name of The Babcock and Wilcox Company discloses a foamed refractory product produced by chemically foaming a mixture of ceramic fibers, elastomer, and a solvent. The present invention contemplates the use of an aqueous based ceramic mixture, which does not contain solvent, to produce a green ceramic foam. Additionally, the present invention contemplates compositions which do not contain materials which react with acid to produce gas (e.g. blowing agents).

The present invention seeks to provide a process for making a porous, foamed, green ceramic, from an aqueous based ceramic compound.

SUMMARY OF THE INVENTION

The present invention provides a process for manufacturing a green ceramic foam having a thickness up to 7.5 cm (3 inches) comprising:

(i) mechanically frothing an aqueous ceramic composition comprising from about 5 to 50 parts by dry weight of an aqueous dispersion of a polymeric binder and from 95 to 50 parts by weight of a particulate ceramic material from 1.5 to 10 times its volume;

(ii) forming said froth into a required shape;

(iii) setting said froth; and (iv) where required drying said froth.

The present invention also contemplates a process in which the produced green foam is sintered.

DETAILED DESCRIPTION OF THE INVENTION

The process of the present invention is useful to produce ceramic foams having a thickness up to about 7.5 cm (3 inches). The density of the ceramic material must be considered as high density material may tend to collapse thick wet ceramic foams When a gelling agent is used in accordance with the present invention, foams up to 7.5 cm (3 inches) thick may be produced. When no gelling agent is used, the foam may be up to about 3.75 cm (1.5 inches) preferably less than 2.54 cm (1 inch). While it may be possible to produce thicker green ceramics, as the foam thickness and/or foam density increases, it becomes more difficult to sinter the green foam. In applications where the green part does not need to be sintered, this will not be a problem. Where sintering is required, the thickness at which the foam may be sintered will be limiting.

In accordance with the present invention, an aqueous based compound comprising; an aqueous dispersion of a polymeric binder, particulate ceramic material, of which optionally up to 45 weight percent may be replaced with ceramic fibers other than asbestos, and optionally surfactant, gelling agents and rheology control agent is frothed. Generally the compound will be frothed from about 1 to 10, preferably from about 2 to 6, most preferably 3 to 5 times its volume. Practically, the weight of one liter of foam may range from about 1500 to 150, preferably 1000 to 350 grams.

The foaming may be carried out continuously in a high shear foaming head such as an Oaks (trademark) brand mixer or batch-wise using conventional rotary beaters such as a Hobart (trademark) brand mixer.

The foam is then formed to the desired shape. This may be by placing the foam in molds or merely by spreading it as a sheet or slab. The shaped foam is then set either in the absence of a gelling agent ("no gel") or by using a gelling agent or system.

The ceramic may be any suitable inorganic non-water reactive ceramic including non-reactive oxides nitrides, and carbides. Some useful ceramics include alumina, zirconia, silica, barium titanate, titanium dioxide, yttria and mixtures thereof. However, in some circumstances it may be possible to use coated water reactive ceramics such as silicon carbide or silicon nitride. The ceramic particles are small particles, preferably the particles will pass through a 200 mesh sieve (74 microns or less particle size). However, if too small a particle size is used, it will require larger amounts of binder. Preferably the ceramic particles will have a particle size distribution such that more than 95 percent of the particles will pass through 140 mesh sieve (e.g. be less than 105 microns) and from 30 to 40 percent of the particles will pass through a 325 mesh sieve (e.g. less than 37 microns). If used, the ceramic fiber may be non-hydrolysable ceramic fibers other than asbestos. The compounds useful in accordance with the present invention comprise from 95 to 60, preferably from about 85 to 75 weight percent of ceramic material. The ceramic will be predominantly particulate material in which up to 45 weight percent of the particles may be replaced by fibers.

In preparing the ceramic particles for use in the present invention, it is best to wet mill the ceramics for up to 24, preferably from 12 to 18 hours prior to use. This breaks down agglomerates and ensure thorough wetting of the particles. For milling typically about 75 to 85 parts by weight of ceramics are dispersed in from about 25 to 15 parts by weight of water. A dispersing agent may be added to the wet ceramic mixture to ensure a uniform dispersion, and reduce reagglomeration. The dispersing agent should be used in amounts not to interfere with the setting process. The dispersing agent may be used in amounts up to 5, preferably less than 2 parts by weight per 100 parts by weight final compound.

There are many suitable dispersing agents. Polyelectrolytes are particularly useful although they may cause a change in viscosity with pH adjustments. A number of dispersing agents are listed in McCutcheons Functional Materials published annually by McCutcheons Division of M. C. Publishing Co Some particularly useful dispersing agents include Daxad 32 brand dispersing agent (Trademark of W. R. Grace) and Darvan C. ,brand dispersing agent (Trademark of R. T. Vanderbelt Co.).

The binders of the present invention are added in the form of an emulsion in water. In selecting a binder the isoelectric point and the surface charge of the ceramic material should be considered. The aqueous emulsion of polymeric binder should not coagulate to any appreciable extent under the conditions of use. In some cases it may be necessary to buffer the ceramic slurry. If a buffer is necessary care should be taken to avoid agents which will contribute undesirable ions to the ceramic slurry. If required, the buffering agent should be selected to provide ions compatible with the end use of the foam. It is also possible to incorporate into the ceramic compound precious metals such as platinum, rhodium, ruthenium, iridium, gold, silver and transition metals such as nickel in suitable amounts (e.g. up to 50, preferably less than 35, most preferably less than 15 weight percent) to provide porous supported catalysts. Heavy metal ions may tend to cause the latex to coagulate. To protect the latex or compound the heavy metals may have to be used with a chelating or sequestering agent such as EDTA (ethylene diamine tetra acetic acid). These could be used in association with fluid or liquid streams for diverse applications from hydrogenation to catalytic combustion to control gaseous emissions.

The binder is generally present in the ceramic compound in an amount from 5 to 35, preferably 10 to 25 parts by weight per 95 to 65, preferably 75 parts of ceramic respectively.

Preferably the polymers of the present invention are polymers which are film forming at or below about 40° C., preferably below room temperature. The polymers should be capable of deformation under pressure and capable of crosslinking or reacting with a crosslinking agent if present upon further energy inputting treatment such as heating, electron beam, ultraviolet light, x-ray, irradiation, etc.

Polymers useful in accordance with the present invention may be generally characterized as polymers of esters including acrylates, SBR type polymers, ethylene vinyl acetates, NBR's, conjugated diolefins and copolymers or homopolymers of vinyl chloride and vinylidene chloride copolymers of ethylene and vinylidene chloride, copolymers of ethylene and vinyl chloride and homopolymers of vinyl aromatics polymers. The selection of the polymer should take into consideration the polymer burn out characteristics. Styrene-butadiene type polymers may give rise to odor problems. PVC polymers will generate HCL. The polymers are used in the form of an aqueous emulsion containing up to about 70 percent by weight of polymer. Commercially available emulsions of polymers in water generally have a polymeric content from about 45 to 60 percent. The polymers may have a Tg from −100 to about +120, preferably from about −20° to +40° C. For polymers with a relatively high Tg it may be necessary to include a conventional external plasticizer. The selection and use of an external plasticizer should take into consideration the burn out characteristics of the plasticizer.

Suitable esters are polymers comprising:

at least about 60, preferably at least 90, weight percent of one or more $C_{1-8}$ or hydroxyalkyl esters of a $C_{3-6}$ ethylenically unsaturated monocarboxylic acid or a half ester of a $C_{3-6}$ ethylenically unsaturated dicarboxylic acid;

up to 40 weight percent of one or more monomers selected from the group consisting of $C_{8-12}$ vinyl aromatic monomers which are unsubstituted or substituted by a $C_{1-4}$ alkyl radical; $C_{3-6}$ alkenyl nitriles and $C_{2-8}$ alkenyl or hydroxy alkenyl esters of a $C_{1-8}$ saturated carboxylic acid; and optionally up to a total of 20 preferably less than 10 weight percent of one or more monomers selected from the group consisting of $C_{3-6}$ ethylenically unsaturated carboxylic acids; $C_{3-6}$ ethylenically unsaturated aldehydes; and amides of $C_{3-6}$ ethylenically unsaturated carboxylic acids which amides are unsubstituted or substituted at the nitrogen atom by up to two radicals selected from the group consisting of $C_{1-4}$ alkyl radicals and $C_{1-4}$ hydroxy alkyl radicals.

The amount of ethylenically unsaturated acid should be chosen to give the required rheology properties in the ceramic dispersion. At high pH's highly carboxylated latices tend to swell and are subject to an upward drift in viscosity. A method for controlling this type of viscosity drift by incorporating from about 0.1 to 10 percent by weight based on the weight of the polymer of a low molecular weight (100 to 5000) $C_{2-4}$ alkylene glycol is disclosed in U.S. Pat. No. 4,474,919 issued Oct. 2, 1985 to Polysar Limited, the text of which is hereby incorporated by reference.

Preferred $C_{3-6}$ ethylenically unsaturated acids include acrylic acid, methacrylic acid and itaconic acid.

Suitable esters of acrylic and methacrylic acid include methyl acrylate, ethyl acrylate, propyl acrylate, butyl acrylate, pentyl acrylate, hexyl acrylate, ethylhexyl acrylate, hydroxyethyl acrylate, methyl methacrylate, ethyl methacrylate, propyl methacrylate, butyl methacrylate, pentyl methacrylate, hexyl methacrylate, ethylhexyl methacrylate, hydroxyethyl methacrylate, and other hydroxy alkyl homologues of the foregoing esters. Homologues of other $C_{3-6}$ ethylenically unsaturated mono carboxylic acids or half esters of dicarboxylic acids are also useful.

Suitable amides include acrylamide, methacrylamide, N-methylol acrylamide, N-methylol methacrylamide. Preferably the polymer contains from about 0.5 to 2.5 weight percent of these amides if they are present.

Suitable vinyl aromatic polymers include styrene, and alpha methyl styrene.

Preferably the ester polymers have a Tg from about −30 to +30° C., most preferably from about −10 to about 25° C.

Suitable $C_{2-8}$ alkenyl and hydroxy alkenyl esters of $C_{1-8}$ saturated carboxylic acids include the vinyl esters such as vinyl acetate. These esters may also be referred to as esters of non-addition polymerizable carboxylic acids.

A particular useful class of esters includes acrylate polymers comprising:

from about 95 to 60, preferably 80 to 60, weight percent of one or more $C_{1-8}$ alkyl or hydroxylalkyl esters of acrylic or methacrylic acid;

from about 1 to 39.5, preferably 4.5 to 35 weight percent of a monomer selected from the group consisting of $C_{8-12}$ vinyl aromatic monomers which are unsubstituted or substituted by a $C_{1-4}$ alkyl radical and a $C_{3-6}$ alkenyl nitrile;

from about 0.5 to 5 weight percent of one or more $C_{3-6}$ ethylenically unsaturated carboxylic acids;

and optionally up to 10, preferably less than about 5, weight percent of one or more amides of a $C_{3-6}$ ethylenically unsaturated carboxylic acid, which amides are unsubstituted or substituted at the nitrogen atom by up to two radicals selected from the group consisting of $C_{1-4}$ alkyl radicals and $C_{1-4}$ hydroxy alkyl radicals.

Useful esters of acrylic and methacrylic have been listed above under the description of acrylic polymers.

Suitable vinyl aromatic monomers have been discussed above.

Suitable alkenyl nitriles include acrylonitrile, methacrylonitrile and nitriles of higher ethylenically unsaturated carboxylic acids.

Suitable ethylenically unsaturated carboxylic acids include acrylic acid, methacrylic acid, fumaric acid and itaconic acid. Preferably the acids are present in an amount from about 0.5 to about 3 weight percent of the binder.

If present, the amide of a $C_{3-6}$ethylenically unsaturated carboxylic acid is present preferably in an amount from about 0.5 to 3 weight percent of the binder. Suitable amides have been discussed above.

Preferably the acrylate polymers have a Tg from about −20° to 35° C.

The polymers of the SBR type have a Tg from about −55° to about 60° C., preferably from about −50° to 40° C. The polymers comprise from about 20 to 60, preferably 20 to about 40 weight percent of one or more $C_{8-12}$ vinyl aromatic monomers which are unsubstituted or substituted by a $C_{1-4}$ alkyl radical; from about 80 to 40, preferably from 80 to 60 weight percent of one or more $C_{4-6}$ conjugated diolefins which are unsubstituted or substituted by a chlorine atom; and optionally from about 0.5 to 10 preferably from about 1.5 to 5 weight percent of one or more monomers selected from the group consisting of $C_{3-6}$ ethylenically unsaturated carboxylic acids; $C_{3-6}$ ethylenically unsaturated aldehydes; $C_{1-4}$ alkyl and hydroxyalkyl esters of $C_{3-6}$ ethylenically unsaturated carboxylic acids; and amides of a $C_{3-6}$ ethylenically unsaturated carboxylic acid which amides are unsubstituted or substituted at the nitrogen atom by up to two radicals selected from the group consisting of $C_{1-4}$ alkyl radicals and $C_{1-4}$ hydroxyalkyl radicals.

Suitable vinyl aromatic monomers have been discussed above. Suitable $C_{4-6}$ conjugated diolefins include butadiene and isoprene. Suitable $C_{3-6}$ unsaturated carboxylic acids and amide derivatives thereof have been discussed above. Suitable $C_{3-6}$ ethylenically unsaturated aldehydes include acrolein.

The polymer may be a co- or ter-polymer of an alpha olefin and a vinyl ester type monomer or vinyl chloride or vinylidene chloride. Preferably the polymer comprises:

from 1 to 25, preferably from 5 to 20 weight percent of one or more $C_{2-3}$ alpha olefins;

from 75 to 99 preferably from 95 to 80 weight percent of one or more monomers selected from the group consisting of a $C_{2-6}$ ethylenically unsaturated esters of a $C_{1-6}$ non-addition polymerizable carboxylic acids, vinyl chloride and vinylidene chloride;

and optionally up to a total of 10 weight percent of one or more monomers selected from the group consisting of $C_{3-6}$ ethylenically unsatuated carboxylic acids;

$C_{1-4}$ alkyl or hydroxy alkyl esters of $C_{3-6}$ ethylenically unsaturated carboxylic acids; amides of $C_{3-6}$ ethylenically unsaturated carboxylic acids which amides are unsubstituted or substituted at the nitrogen atom by up to two radicals selected from the group consisting of $C_{1-4}$ alkyl radical and $C_{1-4}$ hydroxy alkyl radicals, and $C_{3-6}$ ethylenically unsaturated aldehydes. If present, the acid preferably is used in an amount from about 0.5 to 5 weight percent of the polymer. If the amide is present it is also preferred to be used in an amount from 0.5 to 5 weight percent of the polymer.

Preferably the polymer will have a Tg from about −20° to 40° C., most preferably from about −20° to about 25° C.

Suitable ethylenically unsaturated carboxylic acids and amides thereof have been discussed above. Suitable olefins are ethylene and propylene. Suitable unsaturated esters of non-addition polymerizable saturated acids include vinyl acetate, vinyl propionate and vinyl formate.

The polymer may be a nitrile polymer comprising:

from about 15 to 50, preferably from about 20 to 40 weight percent of a $C_{3-6}$ alkenyl nitrile;

from about 85 to 50 weight percent of a mixture of monomers comprising from:

100 to 65 weight percent of a $C_{4-6}$ conjugated diolefin; and up to 35 weight percent of one or more monomers selected from the group consisting of $C_{8-12}$ vinyl aromatic monomers which are unsubstituted or substituted by a chlorine atom or a $C_{1-4}$ alkyl radical and $C_{1-4}$ alkyl and hydroxyalkyl esters of $C_{3-6}$ ethylenically unsaturated carboxylic acids; and optionally up to a total of 10 weight percent of one or more monomers selected from the group consisting of $C_{3-6}$ ethylenically unsaturated carboxylic acids; $C_{3-6}$ ethylenically unsaturated aldehydes; and amides of $C_{3-6}$ ethylenically unsaturated carboxylic acids which amides are unsubstituted or substituted at the nitrogen atom by up to two radicals selected from the group consisting of $C_{1-4}$ alkyl radicals and $C_{1-4}$ hydroxy alkyl radicals.

Preferably the nitrile polymer comprises about 20 to 40 weight percent of an alkenyl nitrile from about 80 to 60 weight percent of a $C_{4-6}$ conjugated diolefin and optionally up to 10 percent of styrene or a carboxylic acid monomer. Suitable monomers have been described above. Generally, the nitriles have a Tg from about −50° to about +40° C. Preferably the polymers have a Tg from about −20° C to about +40° C.

Suitable polymers may be homopolymers or copolymers of vinyl chloride or vinylidene chloride. Homopolymers of vinyl chloride are useful. It is also possible to use a copolymer of vinyl chloride and a $C_{3-6}$ alky or hydroxy alkyl ester of a $C_{3-6}$ ethylenically unsaturated carboxylic acid in a weight ratio from about 25:75 to about 75:25 and optionally up to a total of 10 weight percent of one or more monomers selected from the group consisting of $C_{3-6}$ ethylenically unsaturated carboxylic acids; $C_{3-6}$ ethylenically unsaturated aldehydes; and amides of $C_{3-6}$ ethylenically unsaturated carboxylic acids which amides are unsubstituted or substituted at the nitrogen atom by up to two radicals selected from the group consisting of $C_{1-4}$ alkyl radicals and $C_{1-4}$ hydroxyalkyl radicals.

The homopolymers and copolymers predominantly of the vinyl aromatic monomers are also suitable in the present invention. Suitable polymers comprise at least about 80 percent of a $C_{8-12}$ vinyl aromatic monomer which is unsubstituted or substituted by a $C_{1-4}$ alkyl radical; and optionally up to a total of 10 weight percent of one or more monomers selected from the group consisting of $C_{3-6}$ ethylenically unsaturated carboxylic acids; $C_{3-6}$ ethylenically unsaturated aldehydes; $C_{1-4}$ alkyl or hydroxy alkyl esters of $C_{3-6}$ ethylenically unsaturated carboxylic acids, and amides of $C_{3-6}$ ethylenically unsaturated carboxylic acids which amides are unsubstituted or substituted at the nitrogen atom by up to two radicals selected from the group consisting of $C_{1-4}$ alkyl radicals and $C_{1-4}$ hydroxy alkyl radicals. Suitable monomers have been identified above.

As used in this specification the term polymeric binder is intended to include polymer systems which may contain an external plasticizer. Most of the polymers of the present invention are soft enough not to require the presence of a plasticizer. Some of the higher Tg acrylates, PVC's, and homopolymers of aromatic monomers may require plasticizers. Useful plasticizers include esters such as dioctyl phthalate and the aromatic phosphates. As noted above the burn out characteristics of the plasticizer should be carefully considered.

It is known that the molecular weight distribution of the polymer will affect its adhesive properties. The binder may have a molecular weight distribution as disclosed in U.S. Pat. No. 4,508,864 issued Apr. 2, 1985 to Polysar Limited, the disclosure of which is hereby incorporated by reference, so that from about 20 to about 55 percent of the binder has a molecular weight greater than about 320,000. The methods for controlling the molecular weight of a polymer are well known in the art and do not form part of the teaching of the present application. One suitable method for controlling the molecular weight distribution of acrylate polymers is discussed in U.S. Pat. No. 3,732,139 issued May 8, 1973 to Johnson and Johnson.

From packing theory, it is known that the particle size distribution of polymer particles in a latex will affect the solids content and rheology of the latex and compounds based on the latex. The particle size distribution of the polymer also affects the adhesion and binding power of the polymer. The particle size of the polymer in the latex should be selected on the basis of the particle size of the ceramic material and the required rheology of the ceramic slurry. One useful particle size distribution in high solids compositions is such that from about 65 to 85 weight percent of the polymer particles have a size from 1700 to 3000 A, preferably from 1200 to 1800 A, and from about 35 to 15 weight percent of the polymer particles have a particle size from 300 to 1000 A, preferably from 450 to 650 A. A process for obtaining such a particle size distribution is disclosed in British Pat. Specification 2,138,830 in the name of Polysar Limited, the disclosure of which is hereby incorporated by reference.

To foam the ceramic compound it will usually be necessary to add additional surfactant over that in the aqueous polymeric dispersion. There are a number of types of surfactant available. The surfactant may be a natural soap or a synthetic emulsifier. The natural soaps are soaps of $C_{12-20}$ fatty acids or rosin acids. Useful fatty acid soaps include alkali metal salts of oleic, palmic, stearic and rosin acid. These types of soaps are suitable for use with the silicofluoride or amine-zinc type gel systems. If the aqueous polymeric dispersion is prepared by emulsion polymerization, such soaps may be used in the manufacture of non-carboxylated polymers. This is due to the insolubility or reduced activity of the soap at acid pH.

It is also possible to use synthetic emulsifiers or surfactants. These surfactants include alkali salts of $C_{5-20}$, preferably $C_{6-16}$ alkyl or alkenyl sulfonates and $C_{5-20}$, preferably $C_{6-16}$ alkyl aryl sulfonates. Preferred aryl radicals in these surfactants are benzyl radicals. These emulsifiers may be used to polymerize carboxylated latices and may be used with the tertiary amine and polyvinyl alkyl ether type gelling systems.

If no gelling agent is used when the foam is set, the foam may be stabilized with a $C_{1-10}$, preferably $C_{5-10}$ alkyl sulfosuccinate.

The surfactant should be chosen to be compatible with the surfactant in the aqueous polymeric dispersion. Suitable surfactants are listed in McCutcheon's Detergents and Emulsifiers published annually by the McCutcheon Division MC Publishing Co. The amount of surfactant added to the compound will generally be in the range from 0.1 to 10, preferably 0.1 to 5 parts by weight of surfactant per 100 parts by dry weight of compound. A tendancy for surface cracking in the green ceramic may be overcome by increasing the amount of surfactant in the compound. The amount of surfactant may depend on the surfactant type. The alkyl sulfosuccinates tend to be more efficient foaming aids than the fatty acid soaps.

The setting of the foamed compound may be accomplished merely by drying the foam. If this procedure is used, care must be taken to ensure that the foam will dry before it collapses. This technique will usually not work with foams which are more than about 3.75 cm (1.5 inches) thick. Preferably the foam will not be more than 2.5 cm (1 inch) and most preferably less than 1.2 cm (0.5 inches) thick.

Typical drying conditions are in a forced air oven at up to 150° C. for from 10–40 minutes, preferably at 100°-120° C. for 15–35 minutes. Other types of dryers may be used such as microwave and high frequency dryers. In high energy dryers the power input should be controlled to avoid instant volatilization of the water in the ceramic, thus blowing it up.

The foam may also be gelled prior to drying. In gelling, the foam undergoes a phase inversion. The water phase becomes discontinuous, and the polymer and ceramic form a continuous phase. Subsequent to gelling, the foam ceramic may be dried to remove the aqueous phase.

There are a number of gelling agents which may be used with polymeric latices. Several of these systems operate by including an organic liquid which is less soluble in water at elevated temperatures than a lower temperature.

One of the commercially most useful gelling systems, useful with non-carboxylated latices, stabilized with fatty acid soap comprises salts of silicofluorides. These salts are usually ammonium or alkali salts of silicofluoride preferably sodium silicofluoride. The silicofluoride is added to the compound in an amount from 0.1 to 5 parts by weight per 100 parts by weight of polymer in the compound. Care must be taken if the silicofluoride is used alone. The silicofluoride is a time delay gelling agent. That is, the compound will undergo phase reversal a short time after the addition of the silicofluoride to the compound. Care should be taken to ensure that there is sufficient time to shape the foam prior to gellation.

Generally there is a narrow gel tolerance of aqueous polymeric dispersions to silicofluorides. As a result, with any specific formula, there is a relatively narrow "window" of compound formulation and time within which the compound may be set. This window may be broadened by including in the compound up to about 5, preferably 0.01 to 3 parts by weight per 100 parts by weight of polymer of an agent selected from the group consisting of ammonium and $C_{1-4}$ alkyl sulfamates and sulfates; and ammonium salts of $C_{1-6}$ alkyl carboxylic acids. A particularly useful agent to increase the gel tolerance of the ceramic compound is ammonium sulfamate.

A second gelling system, useful with non-carboxylated latices stabilized with fatty acid soaps, comprises per 100 parts by weight of polymer in said compound from 0.5 to 10 parts by weight of a compound which releases zinc or cadmium ions and sufficient amount of ammonia or an ammonia releasing compound to provide from 1 to 4 parts by weight of ammonia. These systems are generally characterized as temperature controlled gel systems. Compounds containing these gelling systems will gel in a relatively short time after moderate heating. Typically, such compounds will gel in from 5 to 30, preferably less than 20 minutes after exposure to temperature up to 120° C., preferably less than 100° C.

Time delay and temperature control gel systems are used with polymeric latex stabilized with fatty acid or rosin soaps.

Unfortunately, compounds containing such gelling systems have a relatively short pot life. To extend the pot life of the compound, the compound may further include up to 5, preferably from 0.5 to 3 parts by weight per 100 parts by weight of polymer of an agent selected from the group consisting of ammonia, ammonium salts and $C_{1-4}$ alkyl sulfamates and sulfates.

The above gelling systems are useful with non-carboxylated polymers dispersed in an aqueous carrier using a fatty acid soap.

It is also possible to gel compounds based on non-carboxylated fatty acid stabilized latices and carboxylated latices stabilized with alkyl or sulfonates, alkenyl sulfonate, and alkyl sulfosuccinates using tertiary amines, and polyvinyl alkyl ethers.

The above carboxylated compounds may be gelled by incorporating into them from 1 to 20 parts by weight, per 100 parts by weight of polymer of a tertiary amine of the formula

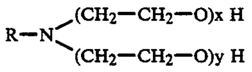

(I)

or

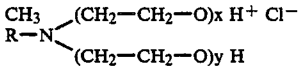

(II)

wherein R is a $C_{10-22}$ alkenyl radical, x and y are integers and the sum of x and y is from 5 to 50. The compound is heated to a temperature greater than about 30, preferably from about 35°-65° C. and it will gel.

The above gelling agent is particularly suitable for use with compounds in which the latex is stabilized with a $C_{6-20}$ alkyl and alkyl aryl sulfonates, and $C_{6-20}$ alkenyl sulfonates.

It is possible to use a mixed gelling agent comprising the above tertiary amine in conjunction with a polyvinyl ($C_{1-4}$) alkyl ether having a K value from 30 to 50, and one gram of polymer in 100 ml of benzene has a specific viscosity of from 0.2 to 0.7. The vinyl ether is used in an amount from 0.1 to 10 parts by weight per 100 parts by weight of polymer. The preferred polyvinyl ($C_{1-4}$) alkyl ether is polyvinyl methyl ether.

It is also possible to use such polyvinyl ether per se without the tertiary amines as gelling agents. The amount and heat conditions for the foamed ceramic remains essentially similar, although it may take longer to gel the compound. When used alone, polyvinyl alkyl ethers may be added to the compound as a 15 percent solution.

The tertiary amine and polyvinyl (alkyl) ether gelling systems may be used with carboxylated polymers, provided the density of the change in the polymer is not too great.

In selecting the gelling system to be used care should be taken. It must be borne in mind that no-gel systems will not produce foam having a thickness greater than about 3.75 cm (1.5 inches). The time dependent gel systems are suitable for thicker foams. In addition to the above limitation, it should be noted that foams which are gelled tend to shrink or contract (syneresis). No-gel foams tend to expand. These factors should be borne in mind when selecting a gelling system for a specific application.

After gelation, the foam may be dried and, if required, subject to further treatment such as a heat treatment to strengthen the green foam. The green foam may also be subjected to sintering under the usual conditions in the industry. Typically the foam may be sintered at temperatures from 1200° to 1800° C., preferably from 1200° to 1550° C. The length of time for the sintering process will depend on the thickness of the green ceramic foam.

The following examples are intended to illustrate the invention and not to limit it. In the examples parts are parts by dry weight unless otherwise specified.

EXPERIMENT 1

An acrylate latex based alumina ceramic compound was prepared from a composition comprising:

| Ingredient | Parts |
| --- | --- |
| Alumina A-16 (ALCOA) | 100 |
| Dispersant (DARVAN 821A) | 0.2 |

-continued

| Ingredient | Parts |
|---|---|
| Plasticizer (SANTICIZER 160) | 2.0 |
| POLYSAR 6160 (Dry) (acrylic latex) | 12.0 |
| POLYSAR 6100 (acrylic latex) | 1.5 |
| Water | 50 |

The compound was stable. The compound was frothed with an electric beater to a density of 0.80 g/cc.

Two drawdowns of the compound were made at ¼" wet. One drawdown was left to dry at room temperature. One drawdown was dried at 70° C.

Both samples resulted in a dry foamed ceramic green part. Care had to be taken with drying at 70° C as cracking may develop. This may be overcome by increasing the amount of surfact, binder or both.

EXPERIMENT 2

After reviewing Experiment 1, it was felt that the extremely small particle size of the alumina being used had such a large surface area that at lower binder levels there was a tendency for surface cracking. A larger size alumina particle was used to prepare a base alumina slurry. The alumina had a particle size distribution such that 99.2 weight percent of the ceramic passed through a 140 mesh sieve (i.e. less than 105 microns) and 35 weight percent of the ceramic passed through a325 mesh sieve (less than 37 microns). This particle size alumina was used in the remainder of the experiments using alumina ceramic powder.

A series of alumina base slurries were prepared comprising:

| | | |
|---|---|---|
| Alumina trihydrate | | 100 |
| Dispersing agent (Daxad 32) | | 0.25 |
| Water | to | 77.5% solids |

In the experiment a cure paste was also included in some of the formulations. The cure paste comprises:

| | |
|---|---|
| Sulfur | 1.65 |
| Zinc Oxide | 1.25 |
| Zinc diethyl dithiocarbonate (Ethyl Zimate) | 1.00 |
| ZMBT (Zinc salt of mercapto - benzothiazole) | 1.25 |
| diphenyl amine acetone reaction product | 0.45 |
| polymeric hindered phenol | 0.30 |
| | 5.90 |

The cure paste is prepared as an aqueous dispersion at about 60 percent solids.

A ceramic compound was prepared having the following formulation (40 percent binder):

| | |
|---|---|
| POLYSAR 425 (a high solids - SBR Latex) | 40 |
| Alumina trihydrate | 100 |
| Cure Paste | 2.4 |
| Soap (sulfosuccinate) | 1.6 |
| Thickener | 0.5 |

The compound was frothed with an electric beater to a wet density of 0.5 g/cc. The compound was drawn down at 200 mil thickness and dried in an oven (hot air circulating) for 12 minutes at 275° F.

The green ceramic foam structure was good and the foam was flexible.

EXPERIMENT 3

Experiment 2 was repeated at 30 percent binder. The compound was frothed to a wet density of 0.42 g/cc. The foam was set as in example 2. The green ceramic foam structure was good and the foam was flexible.

EXPERIMENT 4

Experiment 2 was repeated at 20 percent binder. The compound was frothed to a wet density of 0.41 g/cc. The green ceramic foam structure was good. There were some air bubbles trapped in the foam. This could be corrected by reducing the foam viscosity. The green ceramic foam had some flexibility.

EXPERIMENT 5

Experiment 2 was repeated at 10 percent binder. The compound was frothed to a wet density of 0.44 g/cc. The green ceramic foam had a good structure but no flexibility.

EXPERIMENT 6

A ceramic compound was prepared having the following formula:

| | |
|---|---|
| POLYSAR 6171 (acrylic latex) | 50 |
| Soap | 1.6 |
| Alumina Slurry | 100 |

The compound had a solids content of 65.5 weight percent. The compound was frothed with an electric beater to a wet density of 0.56 g/cc. The foam was drawn down at ¼" thickness and heated under infrared heaters for 1 minute then in a hot air circulating oven at 275° F. for 25 minutes (1 minute with the fan off, 24 minutes with the fan on). The green ceramic foam had a good open cell structure.

EXPERIMENT 7

A ceramic compound was prepared using dry alumina trihydrate. The compound formulation was:

| | |
|---|---|
| POLYSAR 6171 (acrylate latex) | 30 |
| Soap (sulfosuccinate) | 1.6 |
| Dispersant (DAXAD 32) | .25 |
| Alumina trihydroxide | 100 |
| Water - to 75% solids | |

The compound was aged over 2 days. The aged compound was frothed to a density of 0.55 g/cc. The compound was drawn down at a ¼" thickness (wet) and placed under infrared lamps for 1 minute. Then the foam was heated in an oven at 275° F. for 35 minutes. During the first minute the air did not circulate and from 1 to 35 minutes the air circulated. The resulting green ceramic foam had a good surface and cell structure.

EXPERIMENT 8

A ceramic compound was prepared using dry zirconium oxide. The compound formulation was:

| | |
|---|---|
| POLYSAR 6171 (acrylate latex) | 100 |
| Soap (sulfosuccinate) | 1.6 |
| Dispersant (DAXAD 32) | .25 |
| Zirconium oxide | 100 |

Thickener - to a Brookfield viscosity as measured with a #3 spindle and 30 rpm. of 3136 cps. The compound had a solids content of about 50 percent.

The compound was foamed for 2 minutes 30 seconds with a beater and the foam "refined" for an additional 3 minutes.

The foam had a density of 0.53 g/cc. The foam was drawn down at ¼" thickness (wet) and exposed to infrared lamps for 1 minute. The foam was dried in an oven at 275° F. for 37 minutes. For the first minute, the air was not circulated. In the remaining time the air circulated. The resulting foam had a good appearance and a uniform small cell size. The green ceramic foam was flexible.

EXPERIMENT 9

A wet compound of zirconium oxide was prepared having the formulation:

| | |
|---|---|
| POLYSAR 6171 (acrylate latex) | 30 |
| Surfactant (sulfosuccinate) | 1.6 |
| Dispersant (DAXAD 32) | .25 |
| Zirconium Oxide | 100 |

The compound had a solids content of 80 weight percent. The compound was frothed for 4 minutes and refined for 3 minutes to obtain a wet foam having a density of 0.65 g/cc. The compound was drawn down at a wet thickness of ¼" and heated under infrared lamps for 1 minute. The sample was then dried in an oven at 275° F. for 37 minutes. For the first minute, air was not circulated. For the remaining drying time, air was circulated. The green ceramic foam had a uniform small cell structure.

EXPERIMENT 10

A base compound was prepared comprising:

| | |
|---|---|
| POLYSAR 404 (S-B latex) | 100 |
| Potassium Oleate | 3 |
| Trimene Base | 1.25 |
| Cure paste of Ex. 2 | 5.9 |

To the compound was added 100 g (dry) of aluminum trihydroxide of Experiment 2 and sufficient water to bring the solids to 85 weight percent.

The base compound was frothed. To 750 gm of froth, were added 5.4 g of $NH_4$ OH and 14.5 g of a gelling system comprising:

| | |
|---|---|
| Monoethanol amine - (dry) | 10.1 |
| Ammonium sulphamate | 60.0 |
| Water to 69% solids | |

The resulting froth had a density of 0.80 g/cc. The froth was drawn down on a teflon (Trademark) board at ¼" wet thickness. The compound gelled in 5 minutes.

EXPERIMENT 11

The procedure of Experiment 10 was followed except that to 155 g dry weight of frothed compound was added 0.5 g dry weight of a 25 percent solution of sodium silicofluoride. The resulting froth had a density of 0.41 g/cc. The foam was drawn down as in Experiment 10 and it gelled in 12 minutes.

EXPERIMENT 12

A base latex was prepared comprising:

| | |
|---|---|
| POLYSAR 404 (SBR latex) | 100 |
| Potassium Oleate | 3 |
| Trimene Base | 1.25 |
| Cure paste of Ex. 2 | 5.9 |
| Zinc Oxide | 1.75 |

A base slurry of a very fine alumina was prepared (essentially all particles passing through 325 mesh sieve) as a 77.5 percent aqueous slurry. A ceramic compound was prepared comprising:

| | |
|---|---|
| Base latex compound | 111.9 |
| Dispersant | 0.5 |
| Alumina Slurry | 400 |
| Sodium Silicofluoride | 3.00 |

The compound was not frothed but was poured into 2½"deep molds (circular & square) and gelled in 8 minutes.

What is claimed is:

1. A process for manufacturing a green ceramic foam having a thickness of up to 7.5 cm comprising:
   (i) mechanically frothing an aqueous ceramic composition comprising from about 5 to 50 parts by dry weight of an aqueous dispersion of a polymeric binder and from 95 to 60 parts by weight of a particulate ceramic material from 1.5 to 10 times its volume;
   (ii) forming said froth into a required shape;
   (iii) setting said froth; and
   (iv) drying said froth, thereby producing said green ceramic foam.

2. A process according to claim 1 wherein said aqueous ceramic composition comprises 10 to 40 parts by dry weight of an aqueous dispersion of a polymeric binder and from 85 to 75 parts by weight of a particulate ceramic material having a size such that more than 95 percent of the particles pass through a 140 mesh sieve and from 30 to 40 weight percent of the particles pass through 325 mesh sieve.

3. A process according to claim 2 wherein said compound is frothed from 2 to 6 times its original volume.

4. A process according to claim 3 wherein said polymeric binder is selected from the group consisting of:
   (i) polymers comprising: at least about 60 weight percent of one or more $C_{1-8}$ alkyl or hydroxyalkyl esters of a $C_{3-6}$ ethylenically unsatuated monocarboxylic acid or a half ester of a $C_{3-6}$ ethylenically unsaturated dicarboxylic acid; up to 40 weight percent of one or more monomers selected from the group consisting of $C_8$ vinyl aromatic monomers which are unsubstituted or substituted by a $C_{1-4}$ alkyl radical and $C_{3-6}$ alkenyl nitriles; and $C_{3-8}$ alkenyl or hydroxyalkenyl esters of a $C_{1-8}$ saturated carboxylic acid and zero or up to a total of 10 weight percent of one or more monomers selected from the group consisting of $C_{3-6}$ ethylenically unsaturated carboxylic acids; $C_{3-6}$ ethylenically unsaturated aldehydes; and amides of $C_{3-6}$ ethylenically unsaturated carboxylic acids which amides are unsubstituted or substituted at the nitrogen atom by up to two radicals selected from the group consisting of $C_{1-4}$ alkyl radicals and $C_{1-4}$ hydroxyalkyl radicals;

(ii) polymers comprising: from about 20 to about 60 weight percent of $C_{8-12}$ vinyl aromatic monomer which are unsubstituted or substituted by a $C_{1-4}$ alkyl or hydroxyalkyl radical from about 80 to about 40 weight percent of one or more $C_{4-6}$ conjugated diolefins which are unsubstituted or substituted by a chlorine atom; and zero or up to a total of 10 weight percent of one or more monomers selected from the group consisting of $C_{3-6}$ ethylenically unsaturated carboxylic acids; $C_{3-6}$ ethylenically unsaturated aldehydes; $C_{1-4}$ alkyl and hydroxyalkyl esters of $C_{3-6}$ ethylenically unsaturated carboxylic acids and amides of $C_{3-6}$ ethylenically unsaturated carboxylic acids which amides are unsubstituted or substituted at the nitrogen atom by up to two radicals selected from the group consisting of $C_{1-4}$ alkyl radicals and $C_{1-4}$ hydroxyalkyl radicals;

(iii) polymers comprising: from about 1 to 25 weight percent of one or more $C_{2-3}$ $\alpha$-olefins; from about 65 to 99 weight percent of one of more monomers selected from the group consisting of a $C_{2-6}$ ethylenically unsaturated esters of $C_{1-6}$ non-addition polymerizable carboxylic acids, vinyl chloride, and vinylidene chloride; and zero or up to a total of 10 weight percent of one or more monomers selected from the group consisting of $C_{3-6}$ ethylenically unsaturated carboxylic acids; $C_{3-6}$ ethylenically unsaturated aldehydes; $C_{1-4}$ alkyl and hydroxyalkyl esters of $C_{3-6}$ ethylenically unsaturated carboxylic acids and amides of $C_{3-6}$ ethylenically unsaturated carboxylic acids which amides are unsubstituted or substituted at the nitrogen atom by up to two radicals selected from the group consisting of $C_{1-4}$ alkyl radicals and $C_{1-4}$ hydroxyalkyl radicals;

(iv) polymers comprising homopolymers of vinyl chloride and vinylidene chloride;

(v) polymers comprising: from about 15 to 50 weight percent of a $C_{3-6}$ alkenyl nitrile; from 85 to 50 weight percent of a mixture of one or more monomers selected from the group consisting of $C_{8-12}$ vinyl aromatic monomers which are unsubstituted or substituted by a chlorine atom or a $C_{1-4}$ alkyl radical and $C_{1-4}$ alkyl and hydroxyalkyl esters of $C_{3-6}$ ethylenically unsaturated carboxylic acids; and zero or up to a total of 10 weight percent of one or more monomers selected from the group consisting of $C_{3-6}$ ethylenically unsaturated carboxylic acids; $C_{3-6}$ ethylenically unsaturated aldehydes; and amides of $C_{3-6}$ ethylenically unsaturated carboxylic acids which amides are unsubstituted or substituted at the nitrogen atom by up to two radicals selected from the group consisting of $C_{1-4}$ alkyl radicals and $C_{1-4}$ hydroxyalkyl radicals;

(vi) polymers of one or more monomers selected from the group consisting of $C_{4-6}$ conjugated diolefins; and (vii) copolymers comprising: from 75 to 25 weight percent vinyl chloride or vinylidene chlorine and from 25 to 75 weight percent of one or more monomers selected from the group consisting of $C_{3-6}$ alkyl or hydroxyalkyl esters of $C_{3-6}$ ethylenically unsaturated carboxylic acids; and zero or up to a total of 10 weight percent of one or more monomers selected from the group consisting of $C_{3-6}$ ethylenically unsaturated carboxylic acids; $C_{3-6}$ ethylenically unsaturated aldehydes; and amides of $C_{3-6}$ ethylenically unsaturated carboxylic acids which amides are unsubstituted or substituted at the nitrogen atom by up to two radicals selected from the group consisting of $C_{1-4}$ alkyl radicals and $C_{1-4}$ hydroxyalkyl radicals;

(viii) a polymer comprising at least about 80 percent of a $C_{8-12}$ vinyl aromatic monomer which are unsubstituted or substituted by a $C_{1-4}$ alkyl radical; and zero or up to a total of 10 weight percent of one or more monomers selected from the group consisting of $C_{3-6}$ ethylenically unsaturated carboxylic acids; $C_{3-6}$ ethylenically unsaturated aldehydes; $C_{1-4}$ alkyl or hydroxyalkyl esters of $C_{3-6}$ ethylenically unsaturated carboxylic acids; and amides of $C_{3-6}$ ethylenically unsaturated carboxylic acids which amides are unsubstituted or substituted at the nitrogen atom by up to two radicals selected from the group consisting of $C_{1-4}$ alkyl radicals and $C_{1-4}$ hydroxyalkyl radicals.

5. A process according to claim 4 wherein said compound further comprises from about 0.1 to 10 parts by weight per 100 parts by dry weight of a synthetic emulsifier selected from the group consisting of linear $C_{6-16}$ alkyl benzene sulfonates, $C_{1-10}$ alkyl sulfosuccinates and mixtures thereof; said froth is formed to not more than 1.5 inches thick, and said setting is caused by heating said froth and removing water from it prior to its collapse.

6. A process according to claim 4, wherein said particulate ceramic material is further characterized as containing up to 35 weight percent of one or more members selected from the group consisting of precious metals and transition metals.

7. A process according to claim 4, wherein said particulate ceramic material is further characterized as containing up to 45 weight percent of ceramic fibers other than asbestos.

8. A process according to claim 7 wherein said polymer is not carboxylated and said compound is stabilized with from 0.1 to 10 parts by weight per 100 parts by dry weight of compound of a fatty acid or rosin acid soap.

9. A process according to claim 8, wherein said setting is gelling caused by incorporating into said compound from 0.1 to 5 parts by weight per 100 parts of polymer of an alkali metal or ammonium salt of silicofluoride, and zero or up to about 5 parts by weight per 100 parts of polymer of a chemical selected from the group consisting of ammonium and $C_{1-4}$ alkyl sulfonates, ammonium and $C_{1-4}$ alkyl sulfate, and ammonium salts of $C_{1-4}$ alkyl carboxylic acids.

10. A process according to claim 8 wherein said setting is caused by incorporating into said compound from 0.5 to 10 parts by weight percent of an agent which releases zinc or cadmium ions and a sufficient amount of ammonia or an ammonia releasing agent to provide from 0.1 to 4.0 parts by weight of ammonia per 100 parts by weight of polymer, and setting is caused by heating said compound.

11. A process according to claim 10 wherein said compound further optionally comprises up to 5 parts by weight per 100 parts by weight of polymer of an agent selected from the group consisting of ammonium and $C_{1-4}$ alkyl sulfamates, and ammonium and $C_{1-4}$ alkyl sulfates.

12. A process according to claim 7 wherein said gelling is caused by incorporating into said frothed compound from 0.1 to 20 parts by weight per 100 parts by weight of polymer of a tertiary amine of the formula:

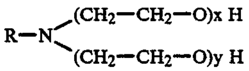

(I)

or

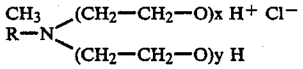

(II)

wherein

R is a $C_{10-22}$ alkenyl radical x and y are integers and the sum of x and y is from 5 to 50 —and heating said compound.

13. A process according to claim 12 wherein the emulsifier in said frothed compound is present in an amount from 0.1 to 10 parts by weight per 100 parts by weight of solids in said compound and is an ammonium or alkali metal alkyl or alkyl aryl sulfonate.

14. A process according to claim 13 wherein said frothed compound further comprises from 0.1 to 10 parts by weight per 100 parts by weight of solids in said compound of a poly (vinyl $C_{1-4}$ alkyl ether), which is soluble in water, has a k value from 30 to 50, one gram of which in 100 ml of benzene and has a specific viscosity from 0.2 to 0.7.

15. A process according to claim 11 wherein said setting is gelling caused by incorporating into said frothed compound from 0.1 to 10 parts by weight per 100 parts by weight of solids in said compound of a polyvinyl $C_{1-4}$ alkyl ether, which is soluble in water, has a k value from 30 to 50, one gram of which is 100 ml of benzene and has a specific viscosity from 0.2 to 0.7 and heating said frothed compound.

16. A process as claimed in claim 4, wherein said process is further characterized in that:

(i) said polymer is not carboxylated and is stabilized with from 0.1 to 10 parts by weight per 100 parts by dry weight of a compound of a fatty acid or rosin acid soap; and (ii) up to 45 weight percent of said particulate ceramic is replaced with ceramic fibers other than asbestos; and (iii) said setting of step (iii) is by gelling caused by incorporated into said compound from 0.1 to 5 parts by weight per 100 parts of polymer of an alkali metal or ammonium salt of silicofluoride, zero or up to about 5 parts by weight per 100 parts of polymer of a chemical selected from the group consisting of ammonium and $C_{1-4}$ alkyl sulfamates, ammonium and $C_{1-4}$ alkyl sulfate, and ammonium salts of $C_{1-4}$ alkyl carboxylic acids.

17. A process as claimed in claim 4, wherein said process is further characterized in that (i) said polymer is not carboxylated and is stabilized with from 0.1 to 10 parts by weight per 100 parts by weight of a compound of a fatty acid or rosin acid soap; and (ii) up to 45 weight percent of said particulate ceramic is replaced with ceramic fibers other than asbestos; and (iii) said setting of step (iii) is by gelling caused by incorporating into said compound from 0.5 to 10 parts by weight percent of an agent which releases zinc or cadmium ions and a sufficient amount of ammonia or an ammonia releasing agent to provide from 0.1 to 4.0 parts by weight of ammonia per 100 parts by weight of polymer, and gelling is caused by heating said compound.

18. A process as claimed in claim 4, wherein said process if further characterized in that (i) said polymer is not carboxylated and is stabilized with from 0.1 to 10 parts by weight per 100 parts by weight of a compound of a fatty acid or rosin acid soap; and (ii) up to 45 weight percent of said particulate ceramic is replaced with ceramic fibers other than asbestos; and (iii) said setting of step (iii) is by gelling caused by incorporating into said frothed compound from 0.1 to 20 parts by weight per 100 parts by weight of polymer of a tertiary amine of the formula:

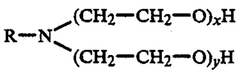

(I)

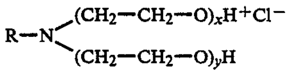

(II)

wherein R is a $C_{10-22}$ alkenyl radical, x and y are integers, and the sum of x and y is from 5 to 50; and heating said compound.

19. A process for manufacturing a sintered ceramic having a thickness of up to 7.5 cm comprising:

(i) mechanically frothing an aqueous ceramic composition comprising from about 5 to 50 parts by dry weight of an aqueous dispersion of a polymeric binder and from 95 to 60 parts by weight of a particulate ceramic material from 1.5 to 10 times its volume;

(ii) forming said froth into a required shape;

(iii) setting said froth;

(iv) drying said froth; and (v) sintering said dried froth, thereby producing said sintered ceramic.

20. A process for manufacturing a sintered ceramic having a thickness of up to 1.5 inches comprising:

(i) mechanically frothing an aqueous ceramic composition comprising from about 5 to 50 parts by dry weight of an aqueous dispersion of a polymeric binder selected from the group consisting of;

(a) polymers comprising: at least about 60 weight percent of one or more $C_{1-8}$ alkyl or hydroxyalkyl esters of a $C_{3-6}$ ethylenically unsaturated monocarboxylic acid or a half ester of a $C_{3-6}$ ethylenically unsaturated dicarboxylic acid; up to 40 weight percent of one or more monomers selected from the group consisting of $C_{8-12}$ vinyl aromatic monomers which are unsubstituted or substituted by a $C_{1-4}$ alkyl radical and $C_{3-6}$ alkenyl nitriles; and $C_{3-8}$ alkenyl or hydroxyalkenyl esters of a $C_{1-8}$ saturated carboxylic acid and zero or up to a total of 10 weight percent of one or more monomers selected from the group consisting of $C_{3-6}$ ethylenically unsaturated carboxylic acids; $C_{3-6}$ ethylenically unsaturated aldehydes; and amides of $C_{3-6}$ ethylenically unsaturated carboxylic acids which amides are unsubstituted or substituted at the nitrogen atom by up to two radicals selected from the group consisting of $C_{1-4}$ alkyl radicals and $C_{1-4}$ hydroxyalkyl radicals;

(b) polymers comprising: from about 20 to about 60 weight percent of $C_{8-12}$ vinyl aromatic monomer which are unsubstituted or substituted by a $C_{1-4}$ alkyl or hydroxyalkyl radical from about 80 to about 40 weight percent of one or more $C_{4-6}$ conjugated diolefins which are unsubstituted or substituted by a chlorine atom; and zero or up to a total of 10 weight percent of one or more monomers selected from the group consisting of $C_{3-6}$ ethylenically unsaturated carboxylic acids; $C_{3-6}$ ethylenically unsaturated aldehydes; $C_{1-4}$ alkyl and hydroxyalkyl esters of $C_{3-6}$ ethylenically unsaturated carboxylic acids and amides of $C_{3-6}$ ethylenically unsaturated carboxylic acids which amides are unsubstituted or substituted at the nitrogen atom by up to two radicals selected from the group consisting of $C_{1-4}$ alkyl radicals and $C_{1-4}$ hydroxyalkyl radicals;

(c) polymers comprising: from about 1 to 25 weight percent of one or more $C_{2-3}$ α-olefins; from about 65 to 99 weight percent of one or more monomers selected from the group consisting of a $C_{2-6}$ ethylenically unsaturated esters of $C_{1-6}$ non-addition polymerizable carboxylic acids, vinyl chloride, and vinylidene chloride; and zero or up to a total of 10 weight percent of one or more monomers selected from the group consisting of $C_{3-6}$ ethylenically unsaturated carboxylic acids; $C_{3-6}$ ethylenically unsaturated aldehydes; $C_{1-4}$ alkyl and hydroxyalkyl esters of $C_{3-6}$ ethylenically unsaturated carboxylic acids and amides of $C_{3-6}$ ethylenically unsaturated carboxylic acids which amides are unsubstituted or substituted at the nitrogen atom by up to two radicals selected from the group consisting of $C_{1-4}$ alkyl radicals and $C_{1-4}$ hydroxyalkyl radicals;

(d) polymers comprising homopolymers of vinyl chloride and vinylidene chloride;

(e) polymers comprising: from about 15 to 50 weight percent of a $C_{3-6}$ alkenyl nitrile; from 85 to 50 weight percent of a mixture of one or more monomers selected from the group consisting of $C_{8-12}$ vinyl aromatic monomers which are unsubstituted or substituted by a chlorine atom or $C_{1-4}$ alkyl radical and $C_{1-4}$ alkyl and hydroxyalkyl esters of $C_{3-6}$ ethylenically unsaturated carboxylic acids; and zero or up to a total of 10 weight percent of one or more monomers selected from the group consisting of $C_{3-6}$ ethylenically unsaturated carboxylic acids; $C_{3-6}$ ethylenically unsaturated aldehydes; and amides of $C_{3-6}$ ethylenically unsaturated carboxylic acids which amides are unsubstituted or substituted as the nitrogen by up to two radicals selected from the group consisting of $C_{1-4}$ alkyl radicals and $C_{1-4}$ hydroxyalkyl radicals;

(f) polymers of one or more monomers selected from the group consisting of $C_{4-6}$ conjugated diolefins; and (g) copolymers comprising: from 75 to 25 weight percent vinyl chloride or vinylidene chloride and from 25 to 75 weight percent of one or more monomers selected from the group consisting of $C_{3-6}$ alkyl or hydroxyalkyl esters of $C_{3-6}$ ethylenically unsaturated carboxylic acids; and zero or up to a total of 10 weight percent of one or more monomers selected from the group consisting of $C_{3-6}$ ethylenically unsaturated carboxylic acids; $C_{3-6}$ ethylenically unsaturated aldehydes; and amides of $C_{3-6}$ ethylenically unsaturated carboxylic acids which amides are unsubstituted or substituted at the nitrogen atom by up to two radicals selected from the group consisting of $C_{1-4}$ alkyl radicals and $C_{1-4}$ hydroxyalkyl radicals;

(h) a polymer comprising at least about 80 percent of a $C_{8-12}$ vinyl aromatic monomer which is unsubstituted or substituted by a $C_{1-4}$ alkyl radical; and zero or up to a total of 10 weight percent of one or more monomers selected from the group consisting of $C_{3-6}$ ethylenically unsaturated carboxylic acids; $C_{3-6}$ ethylenically unsaturated aldehydes; $C_{1-4}$ alkyl or hydroxyalkyl esters of $C_{3-6}$ ethylenically unsaturated carboxylic acids; and amides of $C_{3-6}$ ethylenically unsaturated carboxylic acids which amides are unsubstituted or substituted at the nitrogen atom by up to two radicals selected from the group consisting of $C_{1-4}$ alkyl radicals and $C_{1-4}$ hydroxyalkyl radicals;

and from about 0.1 to 10 parts by weight per 100 parts by dry weight of a synthetic emulsifier selected from the group consisting of linear $C_{6-16}$ alkyl benzene sulfonates, $C_{1-10}$ alkyl sulfosuccinates and mixtures thereof; and from 90 to 60 parts by weight of a particulate ceramic material having a size such that more than 95 percent of the particles passed through a 140 mesh sieve and from 30 to 40 weight percent of the particles passed through 325 mesh sleeve and said compound is frothed from 2 to 6 times its original volume;

(ii) forming said froth into a required shape;

(iii) setting said froth by heating said froth and removing water from it prior to its collapse;

(iv) drying said froth; and (v) sintering said froth, thereby producing a sintered ceramic.

21. A process for manufacturing a sintered ceramic having a thickness of up to 1.5 inches comprising:

(i) mechanically frothing an aqueous ceramic composition comprising from about 5 to 50 parts by dry weight of an aqueous dispersion of a polymeric binder selected from the group consisting of:

(a) polymers comprising: at least about 60 weight percent of one or more $C_{1-8}$ alkyl or hydroxyalkyl esters of a $C_{3-6}$ ethylenically unsaturated monocarboxylic acid or a half ester of a $C_{3-6}$ ethylenically unsaturated dicarboxylic acid; up to 40 weight percent of one or more monomers selected from the group consisting of $C_{8-12}$ vinyl aromatic monomers which are unsubstituted or substituted by a $C_{1-4}$ alkyl radical and $C_{3-6}$ alkenyl nitriles; and $C_{3-8}$ alkenyl or hydroxyalkenyl esters of a $C_{1-8}$ saturated carboxylic acid and zero or up to a total of 10 weight percent of one or more monomers selected from the group consisting of $C_{3-6}$ ethylenically unsaturated carboxylic acids; $C_{3-6}$ ethylenically unsaturated aldehydes; and amides of $C_{3-6}$ ethylenically unsaturated carboxylic acids which amides are unsubstituted or substituted at the nitrogen atom by up to two radicals selected from the group consisting of $C_{1-4}$ alkyl radicals and $C_{1-4}$ hydroxyalkyl radicals;

(b) polymers comprising: from about 20 to about 60 weight percent of $C_{8-12}$ vinyl aromatic monomer which are unsubstituted or substituted by a $C_{1-4}$ alkyl or hydroxyalkyl radical from about 80 to about 40 weight percent of one or more $C_{4-6}$ conjugated diolefins which are unsubstituted or substituted by a chlorine atom; and zero or up to a total of 10 weight percent of one or more monomers selected from the group consisting of $C_{3-6}$ ethylenically unsaturated carboxylic acids; $C_{3-6}$ ethylenically unsaturated aldehydes; $C_{1-4}$ alkyl and hydroxyalkyl esters of $C_{3-6}$ ethylenically unsaturated carboxylic acids and amides of $C_{3-6}$ ethylenically unsaturated carboxylic acids which amides are unsubstituted or substituted at the nitrogen atom by up to two radicals selected from the group consisting of $C_{1-4}$ alkyl radicals and $C_{1-4}$ hydroxyalkyl radicals;

(c) polymers comprising: from about 1 to 25 weight percent of one or more $C_{2-3}$ $\alpha$-olefins; from about 65 to 99 weight percent of one or more monomers selected from the group consisting of a $C_{2-6}$ ethylenically unsaturated esters of $C_{1-6}$ non-addition polymerizable carboxylic acids, vinyl chloride, and vinylidene chloride; and zero or up to a total of 10 weight percent of one or more monomers selected from the group consisting of $C_{3-6}$ ethylenically unsaturated carboxylic acids; $C_{3-6}$ ethylenically unsaturated aldehydes; $C_{1-4}$ alkyl and hydroxyalkyl esters of $C_{3-6}$ ethylenically unsaturated carboxylic acids and amides of $C_{3-6}$ ethylenically unsaturated carboxylic acids which amides are unsubstituted or substituted at the nitrogen atom by up to two radicals selected from the group consisting of $C_{1-4}$ alkyl radicals and $C_{1-4}$ hydroxyalkyl radicals;

(d) polymers comprising homopolymers of vinyl chloride and vinylidene chloride;

(e) polymers comprising: from about 15 to 50 weight percent of a $C_{3-6}$ alkenyl nitrile; from 85 to 50 weight percent of a mixture of one or more monomers selected from the group consisting of $C_{8-12}$ vinyl aromatic monomers which are unsubstituted or substituted by a chlorine atom or $C_{1-4}$ alkyl radical and $C_{1-4}$ alkyl and hydroxyalkyl esters of $C_{3-6}$ ethylenically unsaturated carboxylic acids; and zero or up to a total of 10 weight percent of one or more monomers selected from the group consisting of $C_{3-6}$ ethylenically unsaturated carboxylic acids; $C_{3-6}$ ethylenically unsaturated aldehydes; and amides of $C_{3-6}$ ethylenically unsaturated carboxylic acids which amides are unsubstituted or substituted as the nitrogen by up to two radicals selected from the group consisting of $C_{1-4}$ alkyl radicals and $C_{1-4}$ hydroxyalkyl radicals;

(f) polymers of one or more monomers selected from the group consisting of $C_{4-6}$ conjugated diolefins; and (g) copolymers comprising: from 75 to 25 weight percent vinyl chloride or vinylidene chloride and from 25 to 75 weight percent of one or more monomers selected from the group consisting of $C_{3-6}$ alkyl or hydroxyalkyl esters of $C_{3-6}$ ethylenically unsaturated carboxylic acids; and zero or up to a total of 10 weight percent of one or more monomers selected from the group consisting of $C_{3-6}$ ethylenically unsaturated carboxylic acids; $C_{3-6}$ ethylenically unsaturated aldehydes; and amides of $C_{3-6}$ ethylenically unsaturated carboxylic acids which amides are unsubstituted or substituted at the nitrogen atom by up to two radicals selected from the group consisting of $C_{1-4}$ alkyl radicals and $C_{1-4}$ hydroxyalkyl radicals;

(h) a polymer comprising at least about 80 percent of a $C_{8-12}$ vinyl aromatic monomer which is unsubstituted or substituted by a $C_{1-4}$ alkyl radical; and zero or up to a total of 10 weight percent of one or more monomers selected from the group consisting of $C_{3-6}$ ethylenically unsaturated carboxylic acids; $C_{3-6}$ ethylenically unsaturated aldehydes; $C_{1-4}$ alkyl or hydroxyalkyl esters of $C_{3-6}$ ethylenically unsaturated carboxylic acids; and amides of $C_{3-6}$ ethylenically unsaturated carboxylic acids which amides are unsubstituted or substituted at the nitrogen atom by up to two radicals selected from the group consisting of $C_{1-4}$ alkyl radicals and $C_{1-4}$ hydroxyalkyl radicals;

and from about 0.1 to 10 parts by weight per 100 parts by dry weight of a synthetic emulsifier selected from through group consisting of linear $C_{6-16}$ alkyl benzene sulfonates, $C_{1-10}$ alkyl sulfosuccinates and mixtures thereof; and from 90 to 60 parts by weight of a particulate material selected from the group consisting of precious metals and transistion metals having a size such that more than 95 percent of the particles passed through a 140 mesh sieve and from 30 to 40 weight percent of the particles passed through 325 mesh sieve and said compound is frothed from 2 to 6 times its original volume;

(ii) forming said froth into a required shape;

(iii) setting said froth by heating said froth and removing water from it prior to its collapse;

(iv) drying said froth; and (v) sintering said froth, thereby producing a sintered ceramic.

* * * * *